United States Patent
De Pau-Jr. et al.

(10) Patent No.: US 10,890,504 B2
(45) Date of Patent: Jan. 12, 2021

(54) METHODS AND SYSTEMS FOR DETECTING LEAKAGE IN A THERMAL PROTECTION APPARATUS USING A LIQUID CRYSTAL SHEET

(71) Applicant: The Boeing Company, Chicago, IL (US)

(72) Inventors: Robert De Pau-Jr., Kenmore, WA (US); David V. Siljee, Seattle, WA (US)

(73) Assignee: The Boeing Company, Chicago, IL (US)

( * ) Notice: Subject to any disclaimer, the term of this patent is extended or adjusted under 35 U.S.C. 154(b) by 206 days.

(21) Appl. No.: 16/154,355

(22) Filed: Oct. 8, 2018

(65) Prior Publication Data

US 2020/0109998 A1  Apr. 9, 2020

(51) Int. Cl.
*G01M 3/04* (2006.01)
*G01M 3/20* (2006.01)
(Continued)

(52) U.S. Cl.
CPC ............. *G01M 3/002* (2013.01); *B64D 45/00* (2013.01); *G01K 11/165* (2013.01); *F02K 1/76* (2013.01)

(58) Field of Classification Search
CPC ... G02B 6/0051; G01M 3/002; G01K 11/006; G01K 11/165; B64D 45/00; F02K 1/76;
(Continued)

(56) References Cited

U.S. PATENT DOCUMENTS 9,494,178 B2 * 11/2016 Liu ........................... C09J 5/00
2013/0239875 A1 * 9/2013 Miller ..................... G01M 3/04
116/206
2014/0251831 A1  9/2014 Ley et al.

FOREIGN PATENT DOCUMENTS

JP       S 52130028      11/1977
JP       S 5879241        5/1983
(Continued)

OTHER PUBLICATIONS

Combined Search and Examination Report prepared by the Intellectual Property Office in application No. GB 1914529.1 dated Feb. 20, 2020.
(Continued)

*Primary Examiner* — Brandi N Hopkins
(74) *Attorney, Agent, or Firm* — McDonnell Boehnen Hulbert & Berghoff LLP (57) ABSTRACT

In an example, method of inspecting a thermal protection apparatus is described. The apparatus comprises a composite wall and a thermal insulation blanket, where the thermal insulation blanket is coupled to the wall by way of a sealant disposed around, and offset from, a perimeter of the composite wall and disposed between the composite wall and the thermal insulation blanket, and where the wall, the thermal insulation blanket, and the sealant form a plenum chamber within the apparatus. The method includes pressurizing the plenum chamber with pressurized air, heating the pressurized air within the plenum chamber, and inserting a liquid crystal sheet between the wall and the thermal insulation blanket and proximate to a periphery of the sealant, where the liquid crystal sheet is configured to change color when heated pressurized air exits a gap in the apparatus and heats the liquid crystal sheet.

20 Claims, 8 Drawing Sheets

(51) Int. Cl.
*B64F 5/60* (2017.01)
*G01M 3/00* (2006.01)
*B64D 45/00* (2006.01)
*G01K 11/16* (2006.01)
*F02K 1/76* (2006.01)

(58) Field of Classification Search
CPC . G05D 7/00; G01N 25/72; B23P 11/00; F28F 21/065; F28D 9/00
See application file for complete search history.

(56) References Cited

FOREIGN PATENT DOCUMENTS

| | | |
|---|---|---|
| JP | 2008128666 | 6/2008 |
| KR | 20050033580 | 4/2005 |

OTHER PUBLICATIONS

LCRHallcrest, "Digi-Temp Reversible Thermochromic Liquid Crystal Thermometers", PDS002 Rev 03, www.hallcrest.com, 2 pages.

* cited by examiner

AFTER INSERTING THE LIQUID CRYSTAL SHEET BETWEEN THE COMPOSITE WALL AND THE THERMAL INSULATION BLANKET AND PROXIMATE TO THE PERIPHERY OF THE SEALANT:

DETERMINING A LOCATION OF THE GAP IN RELATION TO A LOCATION OF A SURFACE AREA OF THE LIQUID CRYSTAL SHEET THAT EXHIBITED A COLOR CHANGE WHEN THE LIQUID CRYSTAL SHEET WAS INSERTED BETWEEN THE COMPOSITE WALL AND THE THERMAL INSULATION BLANKET AND PROXIMATE TO THE PERIPHERY OF THE SEALANT ~228

FIG. 13

AFTER INSERTING THE LIQUID CRYSTAL SHEET BETWEEN THE COMPOSITE WALL AND THE THERMAL INSULATION BLANKET AND PROXIMATE TO THE PERIPHERY OF THE SEALANT:

MEASURING A SIZE OF A SURFACE AREA OF THE LIQUID CRYSTAL SHEET THAT EXHIBITED A COLOR CHANGE ~230

BASED ON THE SIZE OF THE SURFACE AREA OF THE LIQUID CRYSTAL SHEET THAT EXHIBITED THE COLOR CHANGE, DETERMINING WHETHER THE GAP IS PRESENT IN THE THERMAL PROTECTION APPARATUS ~232

METHODS AND SYSTEMS FOR DETECTING LEAKAGE IN A THERMAL PROTECTION APPARATUS USING A LIQUID CRYSTAL SHEET

FIELD

The present disclosure relates generally to inspecting a thermal protection apparatus, and more particularly, to detecting leakage in a thermal protection apparatus using a liquid crystal sheet.

BACKGROUND

Thermal protection systems can be employed in an aircraft in order to insulate one area or component of the aircraft from heat generated by, or passing through, another area or component of the aircraft. To accomplish this, an insulating material can be sealed or otherwise coupled to a surface that is to be insulated. If the insulating material is improperly sealed or coupled to the surface, high temperatures can damage the surface.

Existing methods for inspecting thermal protection systems for gaps often involve using ultrasonic leak detectors or a bubbling leak detection fluid. Further, existing methods often require direct line-of-sight in order to determine the presence and location of a gap. However, existing methods can be imprecise, such as when being used to detect small gaps. In addition, when a thermal protection system is located in an area of the aircraft that is difficult to access, it can be difficult to use existing methods that require direct line-of-sight for inspection.

What is needed are precise and efficient methods and systems for inspecting a thermal protection system for gaps.

SUMMARY

In an example, a method of inspecting a thermal protection apparatus is described. The thermal protection apparatus comprises a composite wall and a thermal insulation blanket. The thermal insulation blanket is coupled to the composite wall by way of a sealant disposed around, and offset from, a perimeter of the composite wall and disposed between the composite wall and the thermal insulation blanket. The composite wall, the thermal insulation blanket, and the sealant form a plenum chamber within the thermal protection apparatus. The method comprises pressurizing the plenum chamber with pressurized air, heating the pressurized air within the plenum chamber, and inserting a liquid crystal sheet between the composite wall and the thermal insulation blanket and proximate to a periphery of the sealant, where the liquid crystal sheet is configured to change color when heated pressurized air exits a gap in the thermal protection apparatus and heats the liquid crystal sheet.

In another example, a system comprising a thermal protection apparatus and a liquid crystal sheet is described. The thermal protection apparatus comprises a composite wall and a thermal insulation blanket. The thermal insulation blanket is coupled to the composite wall by way of a sealant disposed around, and offset from, a perimeter of the composite wall and disposed between the composite wall and the thermal insulation blanket. The composite wall, the thermal insulation blanket, and the sealant form a plenum chamber within the thermal protection apparatus. The liquid crystal sheet is removably disposed between the composite wall and the thermal insulation blanket and proximate to a periphery of the sealant. The liquid crystal sheet is configured to change color when heated pressurized air exits a gap in the thermal protection apparatus and heats the liquid crystal sheet.

In another example, non-transitory computer readable medium having stored thereon instructions, that when executed by one or more processors of a computing device, cause the computing device to perform functions is described. The functions comprise pressurizing a plenum chamber within a thermal protection apparatus with pressurized air. The thermal protection apparatus comprises a composite wall and a thermal insulation blanket. The thermal insulation blanket is coupled to the composite wall by way of a sealant disposed around, and offset from, a perimeter of the composite wall and disposed between the composite wall and the thermal insulation blanket. The composite wall, the thermal insulation blanket, and the sealant form the plenum chamber within the thermal protection apparatus. The functions further comprise heating the pressurized air within the plenum chamber and inserting a liquid crystal sheet between the composite wall and the thermal insulation blanket and proximate to a periphery of the sealant, where the liquid crystal sheet is configured to change color when heated pressurized air exits a gap in the thermal protection apparatus and heats the liquid crystal sheet.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the terms "substantially," "about," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

Within examples, methods and systems for detecting leakage (i.e., the presence of a gap) in a thermal protection apparatus are described. A thermal protection apparatus includes a composite wall and a thermal insulation blanket. The thermal insulation blanket is coupled to the composite wall by way of a sealant disposed between the composite wall and the thermal insulation blanket. The sealant is disposed around, and offset from, a perimeter of the composite wall. Together, the composite wall, the sealant, and the thermal insulation blanket form a plenum chamber within the thermal protection apparatus.

A thermal protection apparatus that is arranged as described above can be used in various areas of an aircraft. For example, aircrafts typically include a housing, separate from a fuselage, that holds engines, fuel, and other equipment. The housing (also referred to as a "nacelle") can also include a thrust reverser within the housing that functions to divert an engine's thrust so that thrust is directed forward, instead of backward, thereby providing deceleration. A thermal protection apparatus can be used to insulate a composite inner wall of the thrust reverser fan duct from heat generated by the engine core (e.g., compressor(s), turbine(s), and/or combustion chamber(s)). In this case, a thermal insulation blanket can be sealed to the composite inner wall to prevent hot air from escaping past the thermal insulation blanket. If the thermal protection apparatus is improperly sealed, hot air can circumvent the thermal protection apparatus and damage the composite inner wall.

In these and other scenarios, what is needed are precise and efficient methods and systems for inspecting a thermal protection apparatus for gaps.

Accordingly, the methods and systems described herein involve pressurizing the plenum chamber of the thermal protection apparatus with heated air and then inserting a liquid crystal sheet between the composite wall and the thermal insulation blanket and proximate to a periphery of the sealant. Phrased another way, the liquid crystal sheet is inserted into an area defined by the offset of the sealant from the perimeter of the composite wall. The liquid crystal sheet is thermally-sensitive and configured to change color when heated. Thus, if a gap is present in the thermal protection apparatus (e.g., a gap in the sealant at a location along the sealant), heated, pressurized air will exit the gap and change the color of the liquid crystal sheet as it heats the liquid crystal sheet, thereby providing a visual indication of a presence of the gap.

Furthermore, when the liquid crystal sheet is inserted as described above and a gap in the thermal protection apparatus is present, a location of a surface area of the liquid crystal sheet that exhibits a color change can be correlated to a location of the gap. In addition, when the gap is larger, more heated, pressurized air will exit the gap and thus a larger surface area of the liquid crystal sheet will exhibit a color change, whereas, when the gap is smaller, less heated, pressurized air will exit the gap and thus a smaller surface area of the liquid crystal sheet will exhibit a color change. Thus, the methods and systems described herein improve precision in detecting a location of a gap, and also help estimate a size of the gap. This can be particularly useful in scenarios where the thermal protection apparatus is large, and gaps would otherwise be difficult to locate.

The methods and systems described herein provide other advantages as well. For example, the color change resulting from a gap can occur within a short period of time (e.g., 5 seconds or less) after inserting the liquid crystal sheet, thus reducing time spent inspecting for gaps. As another example, the liquid crystal sheet can be thin (e.g., having a thickness in a range from 50 micrometers to 200 micrometers), and can thus be inserted into small areas to detect gaps at locations that would otherwise be difficult or impossible to access using other inspection methods. Along these lines, the methods and systems described herein do not require direct line-of-sight by personnel that inspect the thermal protection apparatus. As another example, detecting gaps using heated, pressurized air in a plenum chamber and a liquid crystal sheet can be a less costly alternative to existing inspection methods and systems. Further, the methods and systems described herein can be used to help ensure that the thermal protection apparatus is properly sealed before an aircraft having the thermal protection apparatus enters into service, thereby preventing damage to the composite wall due to hot air impingement.

These and other improvements are described in more detail below. Implementations described below are for purposes of example. The implementations described below, as well as other implementations, may provide other improvements as well.

In this disclosure, examples are described primarily with respect to detecting gaps in a thermal protection apparatus that is disposed within a thrust reverser of an aircraft. However, it should be understood that, in other implementations, thermal protection apparatuses can be located in other regions of an aircraft, or can be used in vehicles or other objects other than an aircraft, and can be inspected using the same or similar methods as those described herein.

Figure 1:
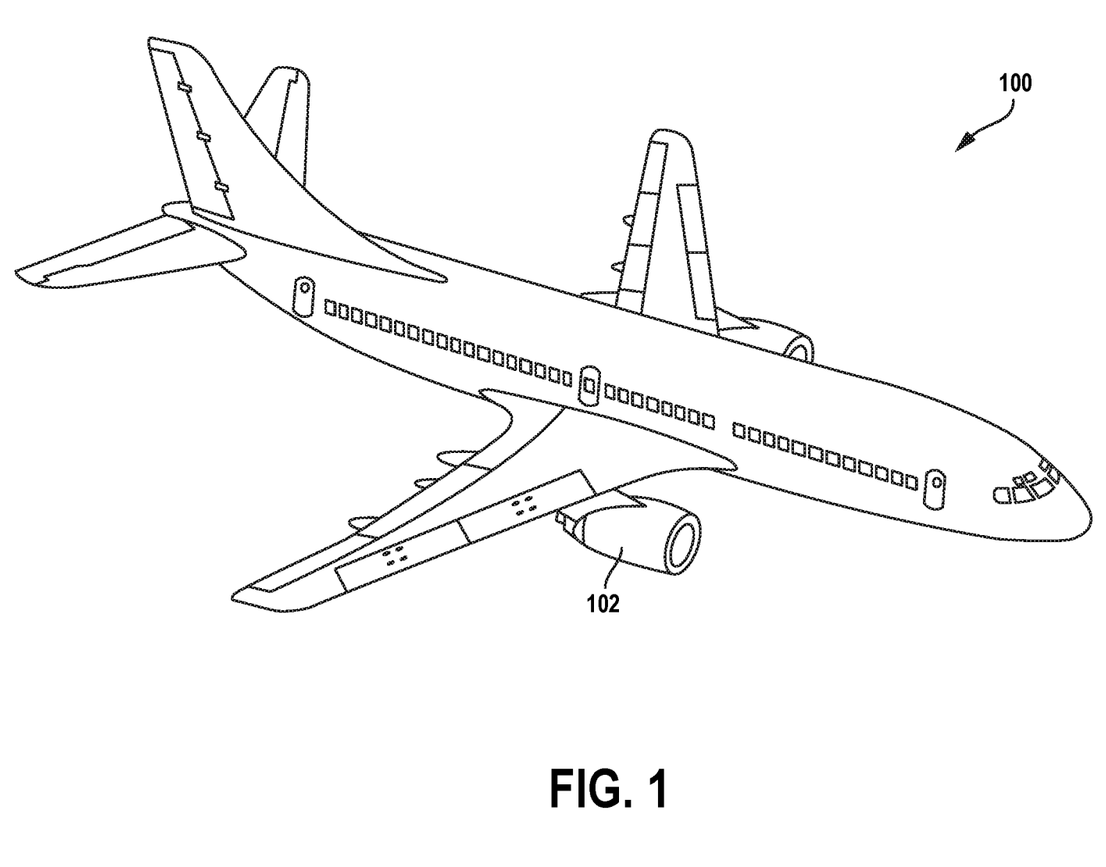
FIG. 1 is a perspective view of an aircraft, according to an example implementation.

Referring now to the figures, FIG. 1 is a perspective view of an aircraft 100, according to an example implementation. Aircraft 100 includes a nacelle 102. As noted above, the nacelle 102 can include a thrust reverser, such as the thrust reverser 104 shown in FIG. 2.

Figure 2:
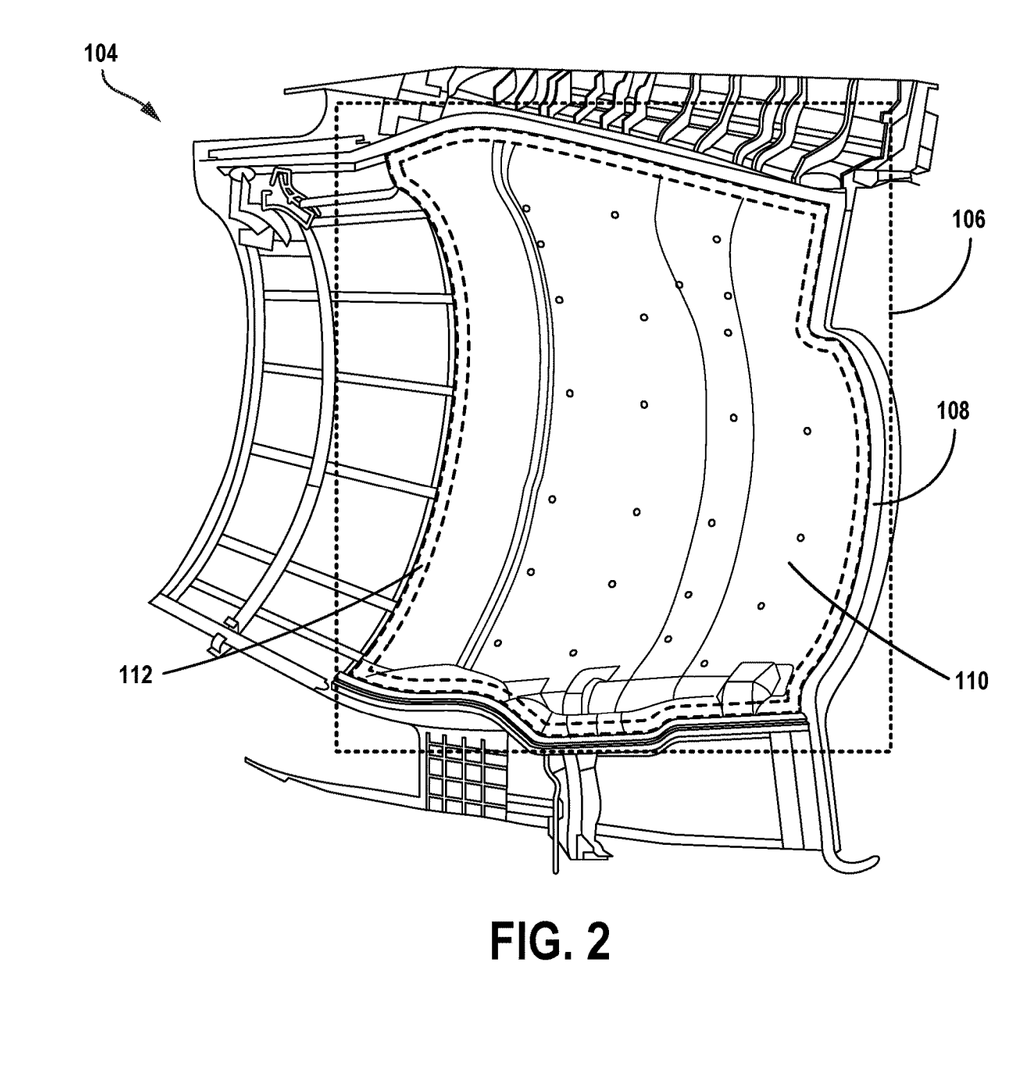
FIG. 2 is a cutaway perspective view of a thrust reverser, according to an example implementation.

FIG. 2 is a cutaway perspective view of a thrust reverser 104, according to an example implementation that may be installed on the aircraft 100 shown in FIG. 1. In particular, FIG. 2 shows a thermal protection apparatus 106 disposed within the thrust reverser 104. The thermal protection apparatus 106 includes a composite wall 108, which also serves as an inner wall structure of the thrust reverser 104. To insulate the composite wall 108 from heat generated by the engine core, the thermal protection apparatus 106 includes a thermal insulation blanket 110 coupled to the composite wall 108 by way of a sealant 112 that is disposed around, and offset from, a perimeter of the composite wall 108 and that is disposed between the composite wall 108 and the thermal insulation blanket 110. The sealant 112 seals the gap between the thermal insulation blanket 110 and the composite wall 108 to prevent hot air from escaping past the thermal insulation blanket 110. Together, the composite wall 108, the thermal insulation blanket 110, and the sealant 112 form a plenum chamber within the thermal protection apparatus 106, such as plenum chamber 114 shown in FIG. 3.

Within examples, the sealant 112 can be a bead of sealant that is manually laid down on a surface of the composite wall 108 and/or a surface of the thermal insulation blanket 110 when assembling the thermal protection apparatus 106, such as in a manner similar to how caulk is applied to a surface. As used herein, a bead is defined as a line of substantially continuously applied ductile material (e.g., sealant 112). The bead of sealant 112 can be a bead of silicone sealant or a bead of another type of sealant.

Within alternative examples, the sealant 112 can be a prefabricated seal that is sealed against the composite wall 108. As a more particular example, such a seal can be a prefabricated silicone seal (e.g., a silicon seal having a silicone impregnated fabric encapsulating an elastomeric core) that is coupled to the thermal insulation blanket 110 and that, when assembling the thermal protection apparatus 106, is sealed against the composite wall 108. Use of a seal can allow the thermal insulation blanket 110 to be removed from the composite wall 108 without damaging the thermal insulation blanket 110. Other types of sealant could be used in addition to or alternatively to the examples described above.

In FIG. 2, the area where the sealant 112 is present is delineated by a pair of dotted lines. The sealant 112 is offset from a perimeter of the composite wall 108. This offset is not explicitly shown in FIG. 2 but is more explicitly shown in FIG. 3. The sealant 112 can be disposed at additional locations to those shown in FIG. 2 and/or at alternative locations.

Within examples, the sealant 112 can have a substantially uniform width in a range between 10 millimeters and 40 millimeters. Alternatively, the substantially uniform width can be outside that range. Within alternative examples, the sealant 112 might not be uniform.

Example methods and systems for inspecting the thermal protection apparatus 106 for leakage will now be described in more detail. In particular, such methods and systems are described at a higher-level with respect to FIG. 3. A more detailed example of methods and systems for inspecting the thermal protection apparatus 106 for leakage is then described with respect to FIG. 4. While the description of FIG. 3 and FIG. 4 discusses some operations as being performed in a particular order, it should be understood that, in alternative examples, such operations could be performed in different orders.

Figure 3:
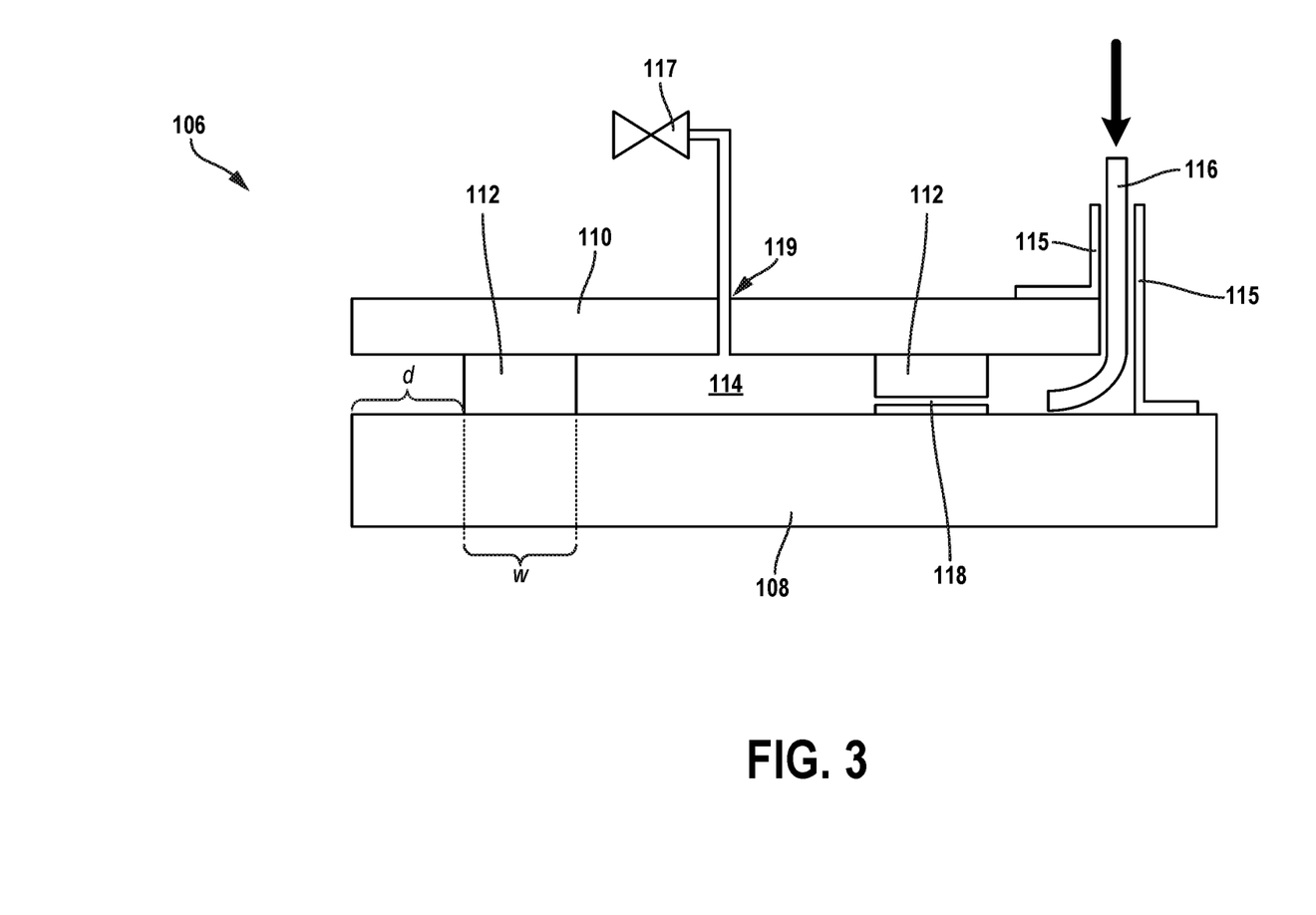
FIG. 3 is a simplified cross-sectional view of a thermal protection apparatus, according to an example implementation.

FIG. 3 is a simplified cross-sectional view of the thermal protection apparatus 106, according to an example implementation. As shown, the sealant 112 is offset from the perimeter (i.e., the outer edge) of the composite wall 108 by a distance, d. Within examples, d could be in a range between 10 millimeters and 60 millimeters. Within alternative examples, d could be a value outside of that range. In either case, d might or might not be substantially uniform around the perimeter of the composite wall 108. Further, the sealant 112 has a width, w, which might or might not be substantially uniform, as discussed above.

As further shown in FIG. 3, the composite wall 108, the thermal insulation blanket 110, and the sealant 112 form a plenum chamber 114 within the thermal protection apparatus 106. In addition, FIG. 3 shows a representative example of a structure 115 that has a small opening, but nonetheless obstructs a direct line-of-sight view of the sealant 112. A metallic heat shield is an example of a form the structure might take, although other structures are possible. In line with the discussion above, the methods and systems described herein overcome the issue of not having direct line-of-sight available by using a liquid crystal sheet for inspecting the thermal protection apparatus 106. As such, FIG. 3 shows a liquid crystal sheet 116 that is inserted into the small opening formed by the structure 115 and that is removably disposed between the composite wall 108 and the thermal insulation blanket 110 and proximate to a periphery of the sealant 112.

Furthermore, FIG. 3 shows a valve 117 that can be used to convey heated, pressurized air into the plenum chamber 114.

To facilitate the color change that indicates the presence of a gap (e.g., a gap in the sealant or a gap between the sealant and the composite wall 108 or thermal insulation blanket 110) in the thermal protection apparatus 106, such as the gap 118 shown in FIG. 3, the liquid crystal sheet 116 can be configured to change color when certain temperature conditions are met. For example, the liquid crystal sheet 116 can include microencapsulated thermochromic liquid crystal molecules coated on a backing (e.g., a black sheet). Such molecules are temperature-sensitive, and their molecular structure can change in relation to changes in temperature, which in turn affects the wavelengths of light reflected and absorbed by the molecules, thereby causing a visual indication of a color change.

The properties of liquid crystal sheets used for inspection can vary, including the temperature ranges that cause the liquid crystal sheets to change color. Thus, the temperature range used for heating the pressurized air in the plenum chamber 114 can be selected based on the properties of the liquid crystal sheet being used for inspection. As an example, the liquid crystal sheet 116 can be configured to change color when the heated pressurized air in the plenum chamber 114 (and thus, the air exiting the plenum chamber 114 through the gap 118) is at a temperature in a range between 100 degrees Fahrenheit and 125 degrees Fahrenheit. Furthermore, the liquid crystal sheet 116 might only exhibit certain colors when the air exiting the plenum chamber 114 falls within a particular temperature range, and thus, the temperature range selected for heating the pressurized air could be selected based on which colors are desired. As an example of a color change, a liquid crystal sheet having a default color of black could be selected, and could be configured such that temperatures within the range of 100 degrees Fahrenheit and 125 degrees Fahrenheit cause the liquid crystal sheet 116 to change from black to a non-black color, such as blue, green, yellow, and/or red. Other default colors, color changes, and temperature ranges are possible as well. Some color changes, such as black to blue, can indicate hotter temperatures than other color changes, such as black to red or black to green.

To inspect the thermal protection apparatus 106, the plenum chamber 114 is pressurized with pressurized air, and the pressurized air within the plenum chamber 114 is heated. Within examples, the heated, pressurized air can be inserted into the plenum chamber 114 at a proximate geometric center of the thermal protection apparatus 106 (i.e., at, or within a threshold distance from, the actual geometric center of the thermal protection apparatus 106, where the threshold is based on a manufacturing tolerance), such as location 119 shown in FIG. 3. That way, a substantially uniform distribution of heated, pressurized air can be achieved, as the location at which heated, pressurized air is introduced into the plenum chamber 114 can be substantially equidistant to all sealed regions being inspected. As an example, pressurized air can be inserted into the plenum chamber 114 at location 119 shown in FIG. 3. As the distance from the location where heated, pressurized air is inserted increases, the temperature and pressure can decrease. For example, injecting heated, pressurized air proximate to one edge of the thermal protection apparatus 106 can cause high temperature and pressure at the one edge, but the temperature and pressure at an opposite edge would be reduced, thereby reducing the effectiveness of inspection at the opposite edge. Thus, to increase the effectiveness of the inspection process overall, it is desirable to have substantially uniformly-distributed heated, pressurized air. Further, the underlying geometry of a thermal protection apparatus can vary from case to case, and the location at which the pressurized air is introduced should be as close to a geometric center of the thermal protection apparatus 106 as possible to achieve uniform distribution.

A pressure range for pressurizing the plenum chamber 114 can be selected based on various factors. For example, a pressure range can be selected such that, if a gap or gaps is/are present, a desirable amount of air will exit such gap(s), but such that, if no gaps are present, the pressure within the selected range may be low enough so as not to cause any damage to the thermal protection apparatus 106. Within examples, the plenum chamber 114 can be pressurized to a pressure in a range between 0.05 pounds per square inch gauge (psig) to 0.1 pounds psig, where this range is selected to avoid causing damage to the thermal insulation blanket 110.

Further, the temperature to which to heat the pressurized air within the plenum chamber 114 can be selected based on the configuration of the liquid crystal sheet 116. For instance, in examples where the plenum chamber 114 is pressurized to a pressure in the range between 0.05 psig to 0.1 pounds psig, or in alternative examples, the pressurized air within the plenum chamber 114 can be heated to a temperature in a range between 100 degrees Fahrenheit and 125 degrees Fahrenheit because, as noted above, the liquid crystal sheet 116 can be configured to change colors when exposed to heat in this range.

Pressure and temperature ranges other than those described above could be selected as well. Other temperature ranges could be selected based on how the liquid crystal sheet 116 is configured (e.g., at which temperatures the liquid crystal sheet 116 exhibits a desired degree of a color change).

Within examples, the act of pressurizing the plenum chamber 114 with pressurized air and heating the pressurized air within the plenum chamber 114 can involve controlling a heating device (e.g., heating device 124 of FIG. 4) to heat the pressurized air and, after heating the pressurized air, causing the heated pressurized air to be conveyed into the plenum chamber 114. The heating device can be configured to heat the pressurized air before the heated pressurized air is conveyed into the plenum chamber 114 and can take various forms, such as an in-line heater. Further, the heating device can be controlled by a controller (e.g., controller 130 of FIG. 4), such as a proportional-integral-derivative (PID) controller or other type of controller. Still further, a temperature sensor can be located in the plenum chamber 114 and configured to acquire data indicative of a temperature of the heated pressurized air within the plenum chamber 114. As such, the controller can use the acquired data to regulate the temperature of the heated pressurized air within the plenum chamber 114, such as by adjusting the temperature at which the heating device is heating the pressurized air.

Within examples, the act of regulating the temperature of the heated pressurized air within the plenum chamber based on the data acquired by the temperature sensor can involve the controller receiving the data from the temperature sensor and determining that the temperature of the heated pressurized air is outside of a predefined temperature range (e.g., outside of the range of range between 100 degrees Fahrenheit and 125 degrees Fahrenheit). In response to the controller determining that the temperature of the heated pressurized air is outside of the predefined temperature range, the controller can control the heating device to adjust the temperature at which the heating device is heating the pressurized air.

In line with the discussion above, if during inspection the temperature of the air in the plenum chamber 114 is too low or too high (e.g., outside of the 100 degrees Fahrenheit and 125 degrees Fahrenheit range described above), more air is conveyed into the plenum chamber 114, but at a higher or lower temperature than before. This can raise the pressure in the plenum chamber 114, and the resulting pressure may be higher than desired (e.g., outside of the 0.05 psig to 0.1 psig range). Thus, within examples, before the plenum chamber 114 is pressurized with pressurized air, an outlet in the thermal insulation blanket 110 can be provided, where the outlet is configured for venting pressurized air from the plenum chamber 114, increasing flow rate of pressurized air into the plenum chamber 114, and maintaining substantially constant pressure in the plenum chamber 114. The location of such an outlet can vary, but in order to achieve a substantially uniform distribution of heated, pressurized air, the outlet should generally be located proximate to the location 119 where the heated, pressurized air is inserted into the plenum chamber 114. As an example, the outlet can be located within a distance from the location 119 that is 10% of the distance between an edge of the thermal protection apparatus 106 and the location 119. Other examples are possible as well.

As discussed above, the liquid crystal sheet 116 changes color when exposed to heated air and can thus be used to detect the presence and location (and perhaps additionally a size) of a gap (e.g., gap 118) in the thermal protection apparatus 106, since heated air would exit the gap when the plenum chamber 114 is pressurized with heated air. Again, to facilitate this, the liquid crystal sheet 116 can be inserted between the composite wall 108 and the thermal insulation blanket 110 at one or more locations along the periphery of the sealant 112. Within examples, the act of inserting the liquid crystal sheet 116 can involve inserting the liquid crystal sheet 116 for a time in a range between 0.5 and 3 seconds, after which the liquid crystal sheet 116 can be removed (or left inserted) and inspected for color changes. The short exposure time needed to cause a color change can reduce total inspection time for the thermal protection apparatus 106. In some scenarios, however, it may take more or less time than 0.5 to 3 seconds in order for the crystals in the liquid crystal sheet 116 to absorb heat and exhibit a color change indicative of a gap. The type of liquid crystal sheet used can affect exposure time and/or a temperature level needed to cause the color change.

Within examples, after inserting the liquid crystal sheet 116, the liquid crystal sheet 116 can be inspected to determine a location of the gap in relation to a location of a surface area of the liquid crystal sheet 116 that exhibited a color change when the liquid crystal sheet 116 was inserted. As a more particular example, consider a scenario involving a square-shaped thermal protection apparatus 106. In this scenario, a liquid crystal sheet 116 having the same length as one side of the thermal protection apparatus 106 (although the similar lengths are not required to determine a gap) can be inserted as described above when the plenum chamber 114 is being pressurized with heated air. As a result, a surface area of the liquid crystal sheet 116 that is approximately 5 centimeters away from an end of the liquid crystal sheet 116 may be exposed to heated air from a gap and exhibit a color change. As such, it can be determined that there is a gap in the thermal protection apparatus 106 that is approximately 5 centimeters away from an end of the side of the thermal protection apparatus 106 where the liquid crystal sheet 116 was inserted. Other examples are possible as well.

Within examples, after inserting the liquid crystal sheet 116, a size of a surface area of the liquid crystal sheet 116 that exhibited a color change can be measured and, based on the size of the surface area of the liquid crystal sheet 116 that exhibited the color change, it can be determined whether a gap is present in the thermal protection apparatus. In some scenarios, small portions of the surface area of the liquid crystal sheet 116 might change color for reasons other than a gap, such as inadvertent exposure of the liquid crystal sheet 116 to other sources of heat, and such small portions might not be considered to be correlated with a gap in the thermal protection apparatus 106. Further, if a gap is determined to be present, the size of the surface area of the liquid crystal sheet 116 that exhibited the color change could be roughly correlated to a size of the gap (e.g., a larger surface area means that there is a larger gap), which can be useful in determining which gaps (if any) are most important (e.g., most likely to result in damage to the composite wall 108 if not properly sealed).

Figure 4:
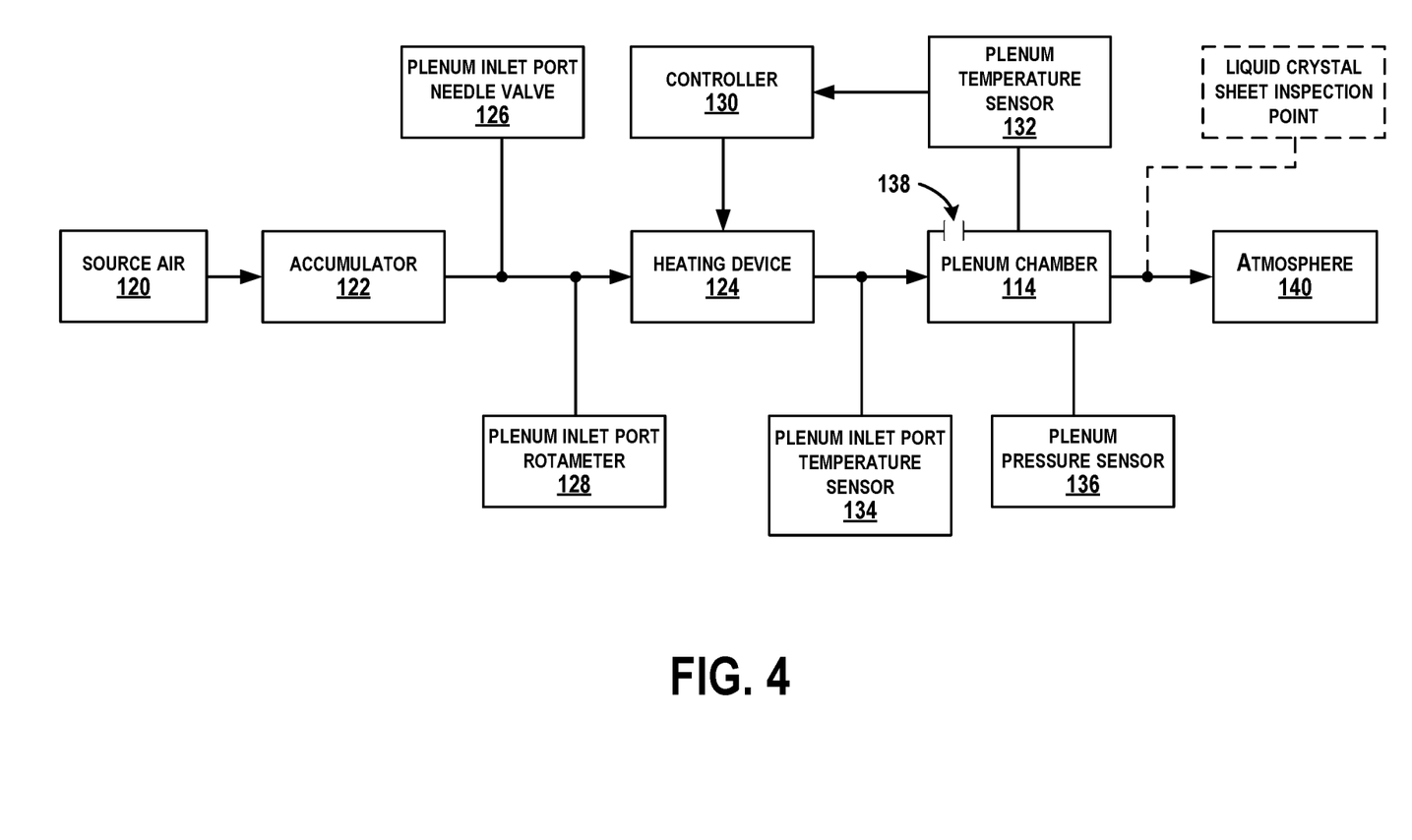
FIG. 4 is a diagram depicting aspects and equipment involved in an example process for inspecting the thermal protection apparatus of FIG. 3, according to an example implementation.

FIG. 4 is a diagram depicting aspects and equipment involved in an example process for inspecting the thermal protection apparatus 106, according to an example implementation. FIG. 4 includes various aspects and equipment described above, as well as some additional aspects and equipment.

As shown, source air 120 is stored in an accumulator 122 configured to store pressurized air. Pressurized air can then be conveyed from the accumulator 122 into a heating device 124 and then into the plenum chamber 114. The accumulator 122 can be an air tank or other housing configured to store pressurized air.

The inspection process can also involve a plenum inlet port needle valve 126 that is configured to control inlet air into the heating device 124 (e.g., either by an individual manually opening the valve or by instructing a device to open the value) and can also involve a plenum inlet port rotameter 128 configured to monitor an inlet air flow rate of pressurized air into the heating device 124. Although the accumulator 122 and the heating device 124 are shown as separate components, in some examples, the accumulator 122 could include a heating device configured to heat pressurized air stored in the accumulator 122.

As discussed above, a controller 130 can regulate the temperature of the pressurized air conveyed into the plenum chamber 114. To facilitate this, for example, a plenum temperature sensor 132 (e.g., a thermocouple) configured to monitor the temperature of the heated pressurized air within the plenum chamber 114 can be disposed in the plenum chamber 114. The controller 130 can receive periodic or continuous measurements of the air temperature in the plenum chamber 114 and, when the temperature falls below or above a predetermined threshold (or outside a predetermined range), the controller 130 can responsively adjust (e.g., increase or decrease) the temperature at which the heating device 124 is heating the pressurized air that is conveyed into the plenum chamber 114.

Also shown in FIG. 4 are a plenum inlet port temperature sensor 134 (e.g., another thermocouple), a plenum pressure sensor 136, and an outlet 138. The plenum inlet port temperature sensor 134 can be configured to monitor the temperature of air leaving the heating device 124 The temperature read by the plenum inlet port temperature sensor 134 can be used as an additional basis for adjusting the temperature at which the heating device 124 is heating the pressurized air, such as in the same manner discussed above with respect to how temperature data from the plenum temperature sensor 132 is used as such). The plenum pressure sensor 136 can be disposed in the plenum chamber 114 and configured to monitor the pressure of the air in the plenum chamber 114. Within examples, the plenum pressure sensor 136 could be communicatively linked to the controller 130 or another computing device such that, when the pressure in the plenum chamber 114 falls below or above a predetermined threshold (or outside a predetermined range), the controller 130 or other device can responsively adjust (e.g., increase or decrease) the pressure at which the source air 120 is being pressurized. Other examples are possible as well. Further, the outlet 138 can be used to vent air so as not to increase the pressure in the plenum chamber 114 to an undesirable level.

With the arrangement shown in FIG. 4, when there is a gap in the thermal protection apparatus 106, heated air exits the plenum chamber 114 into the atmosphere 140, and thus a liquid crystal sheet 116 can be inserted between the composite wall 108 and the thermal insulation blanket 110 at one or more locations along the periphery of the sealant 112.

Figure 5:
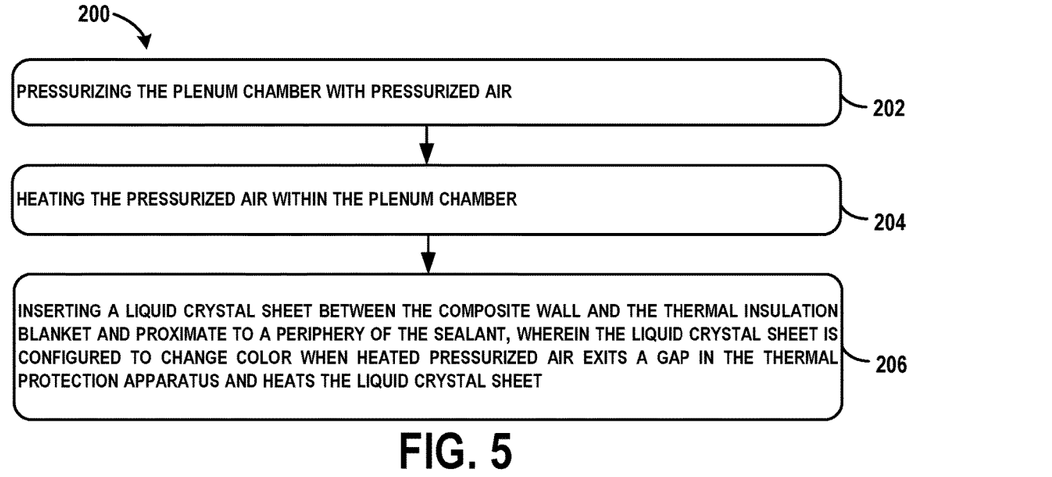
FIG. 5 shows a flowchart of an example method 200 of inspecting a thermal protection apparatus, according to an example implementation.

FIG. 5 shows a flowchart of an example method 200 of inspecting a thermal protection apparatus, according to an example implementation. Method 200 shown in FIG. 5 presents an example of a method that could be used with the thermal protection apparatus 106 shown in FIG. 2 and FIG. 3, for example. Further, devices or systems may be used or configured to perform logical functions presented in FIG. 5. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 5, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes pressurizing the plenum chamber with pressurized air.

Figure 6:
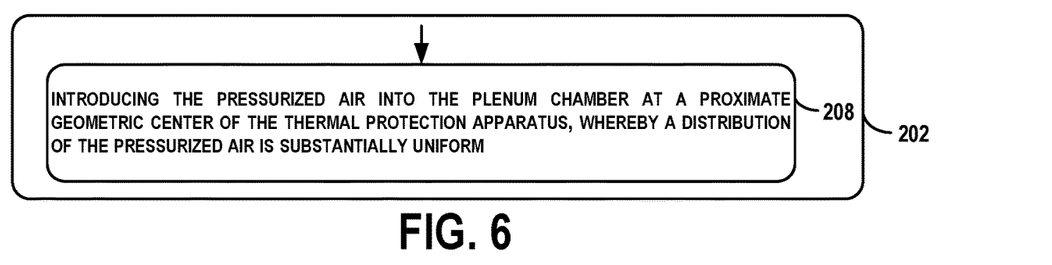
FIG. 6 shows a flowchart of an example method for performing the pressurizing function of the method of FIG. 5, according to an example implementation.

FIG. 6 shows a flowchart of an example method for performing the pressurizing as shown in block 202, according to an example implementation. At block 208, functions include introducing the pressurized air into the plenum chamber at a proximate geometric center of the thermal protection apparatus, whereby a distribution of the pressurized air is substantially uniform.

Figure 7:
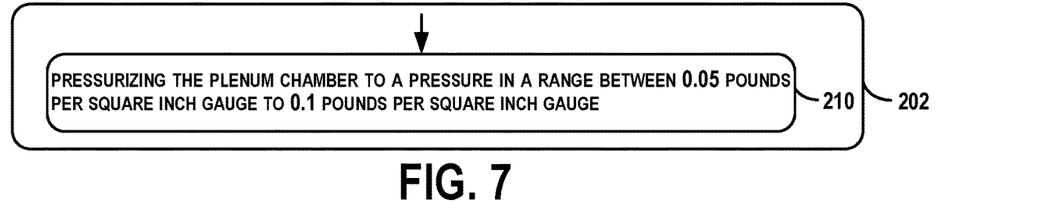
FIG. 7 shows a flowchart of another example method for performing the pressurizing function of the method of FIG. 5, according to an example implementation.

FIG. 7 shows a flowchart of another example method for performing the pressurizing as shown in block 202, according to an example implementation. At block 210, functions include pressurizing the plenum chamber to a pressure in a range between 0.05 pounds per square inch gauge to 0.1 pounds per square inch gauge.

Figure 8:
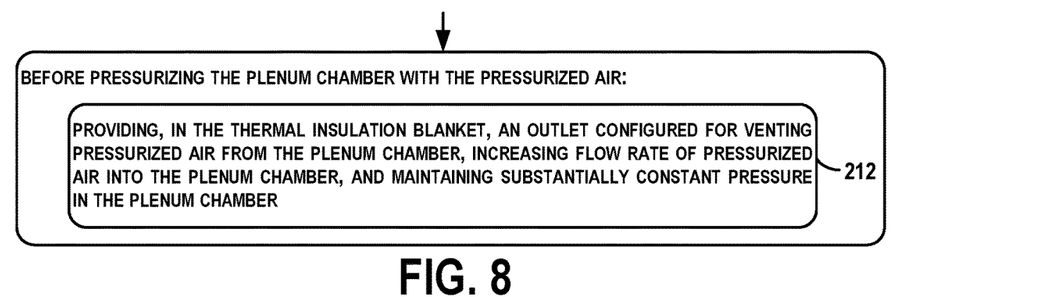
FIG. 8 shows a flowchart of an example method for use with the method of FIG. 5, according to an example implementation.

In some implementations, some actions can be performed before pressurizing the plenum chamber with the pressurized air. FIG. 8 shows a flowchart of an example method for use with the method 200, according to an example implementation. Before pressurizing the plenum chamber with the pressurized air, actions include providing, in the thermal insulation blanket, an outlet configured for venting pressurized air from the plenum chamber, increasing flow rate of pressurized air into the plenum chamber, and maintaining substantially constant pressure in the plenum chamber, as shown in block 212.

Referring back to FIG. 5, at block 204, the method 200 includes heating the pressurized air within the plenum chamber.

Figure 9:
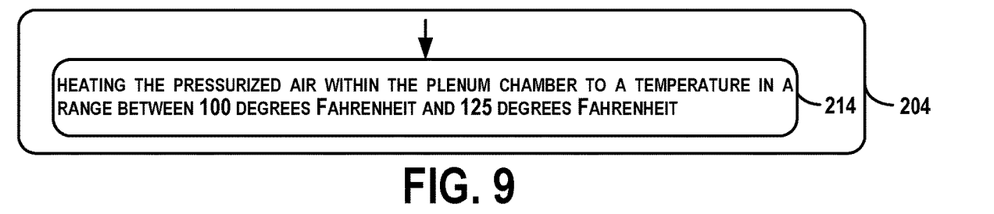
FIG. 9 shows a flowchart of an example method for performing the heating function of the method of FIG. 5, according to an example implementation.

FIG. 9 shows a flowchart of an example method for performing the heating as shown in block 204, according to an example implementation. At block 214, functions include heating the pressurized air within the plenum chamber to a temperature in a range between 100 degrees Fahrenheit and 125 degrees Fahrenheit.

Figure 10:
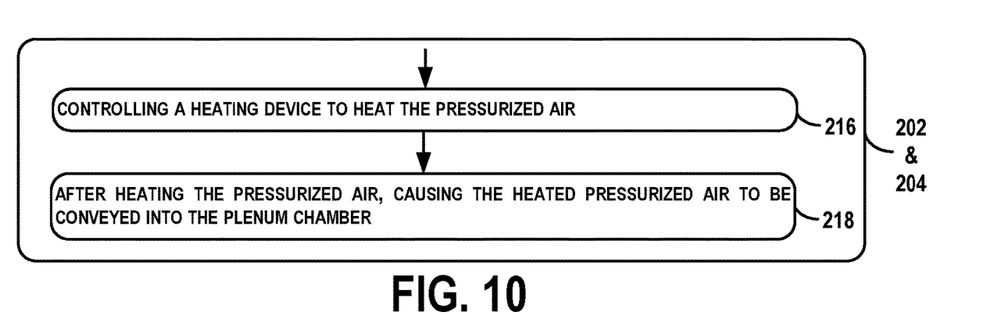
FIG. 10 shows a flowchart of an example method for performing the pressurizing and heating functions of the method of FIG. 5, according to an example implementation.

FIG. 10 shows a flowchart of an example method for performing the pressurizing and heating as shown in block 202 and block 204, respectively, according to an example implementation. At block 216, functions include controlling a heating device to heat the pressurized air, and at block 218, functions include after heating the pressurized air, causing the heated pressurized air to be conveyed into the plenum chamber.

Figure 11:
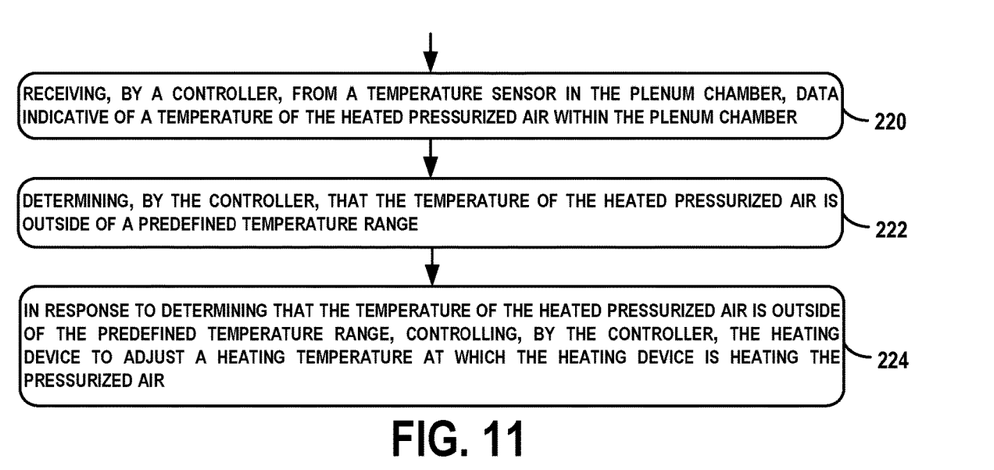
FIG. 11 shows a flowchart of an example method for use with the method of FIG. 10, according to an example implementation.

In some implementations where a heating device heats the pressurized air and then the heated pressurized air is conveyed into the plenum chamber, as shown in block 216 and block 218, other functions can be performed. FIG. 11 shows a flowchart of an example method for use with the method 200, according to an example implementation. In particular, the example method shown in FIG. 11 is for use with the example method shown in FIG. 10. As discussed above, the heating device can be an in-line air heater or other type of heating device configured to heat air.

At block 220, functions include receiving, by a controller, from a temperature sensor in the plenum chamber, data indicative of a temperature of the heated pressurized air within the plenum chamber. At block 222, functions include determining, by the controller, that the temperature of the heated pressurized air is outside of a predefined temperature range. And at block 224, functions include, in response to determining that the temperature of the heated pressurized air is outside of the predefined temperature range, controlling, by the controller, the heating device to adjust a heating temperature at which the heating device is heating the pressurized air. As discussed above, the controller can be a PID controller.

Referring back to FIG. 5, at block 206, the method 200 includes inserting a liquid crystal sheet between the composite wall and the thermal insulation blanket and proximate to a periphery of the sealant. As described above, the liquid crystal sheet is configured to change color when heated pressurized air exits a gap in the thermal protection apparatus and heats the liquid crystal sheet.

Figure 12:
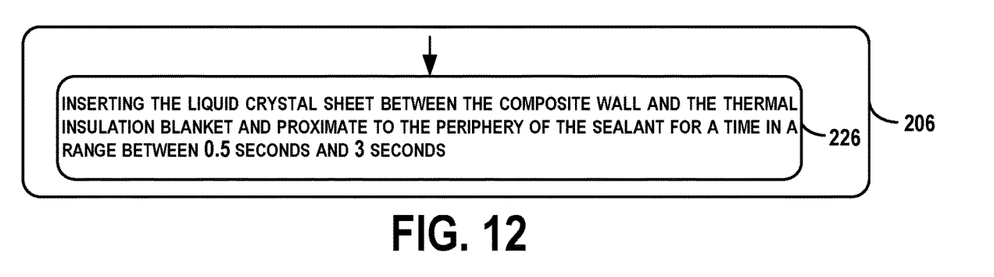
FIG. 12 shows a flowchart of an example method for performing the inserting function of the method of FIG. 5, according to an example implementation.

FIG. 12 shows a flowchart of an example method for performing the inserting as shown in block 206, according to an example implementation. At block 226, functions include inserting the liquid crystal sheet between the composite wall and the thermal insulation blanket and proximate to the periphery of the sealant for a time in a range between 0.5 seconds and 3 seconds.

Figure 13:
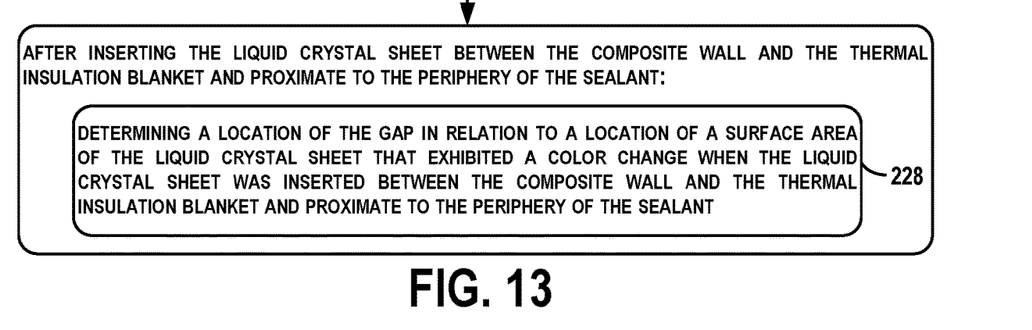
FIG. 13 shows a flowchart of another example method for use with the method of FIG. 5, according to an example implementation.

In some implementations, some actions can be performed after inserting the liquid crystal sheet between the composite wall and the thermal insulation blanket and proximate to the periphery of the sealant. For example, such actions can relate to determining a location of a potential gap in the thermal protection apparatus. FIG. 13 shows a flowchart of another example method for use with the method 200, according to an example implementation. After inserting the liquid crystal sheet between the composite wall and the thermal insulation blanket and proximate to the periphery of the sealant, functions include determining a location of the gap in relation to a location of a surface area of the liquid crystal sheet that exhibited a color change when the liquid crystal sheet was inserted between the composite wall and the thermal insulation blanket and proximate to the periphery of the sealant, as shown in block 228.

Figure 14:
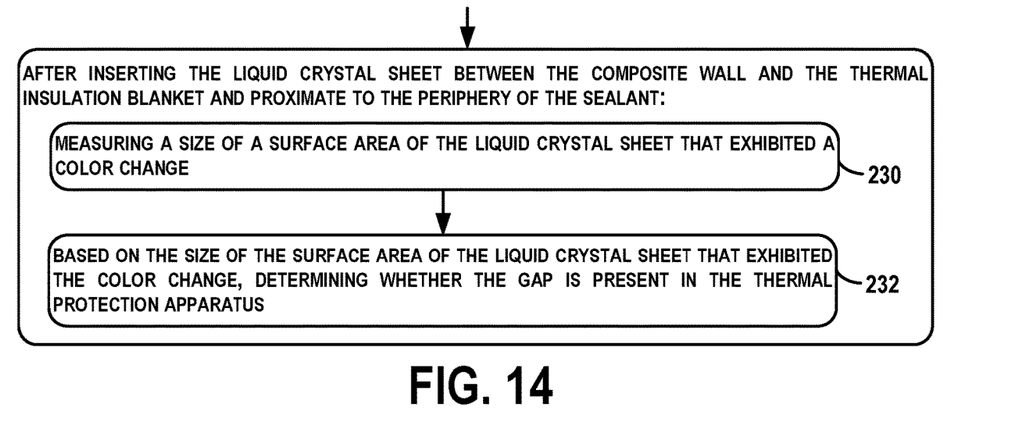
FIG. 14 shows a flowchart of another example method for use with the method of FIG. 5, according to an example implementation.

As another example, such actions can relate to determining a size of a potential gap in the thermal protection apparatus. FIG. 14 shows a flowchart of another example method for use with the method 200, according to an example implementation. After inserting the liquid crystal sheet between the composite wall and the thermal insulation blanket and proximate to the periphery of the sealant, functions include measuring a size of a surface area of the liquid crystal sheet that exhibited a color change, and, based on the size of the surface area of the liquid crystal sheet that exhibited the color change, determining whether the gap is present in the thermal protection apparatus, as shown in block 230 and block 232.

Within examples of the methods and systems described herein, and in line with the discussion above, a computing device can be configured to perform, and/or cause one or more other devices, components, etc. to perform, one or more of the operations described herein.

Figure 15:
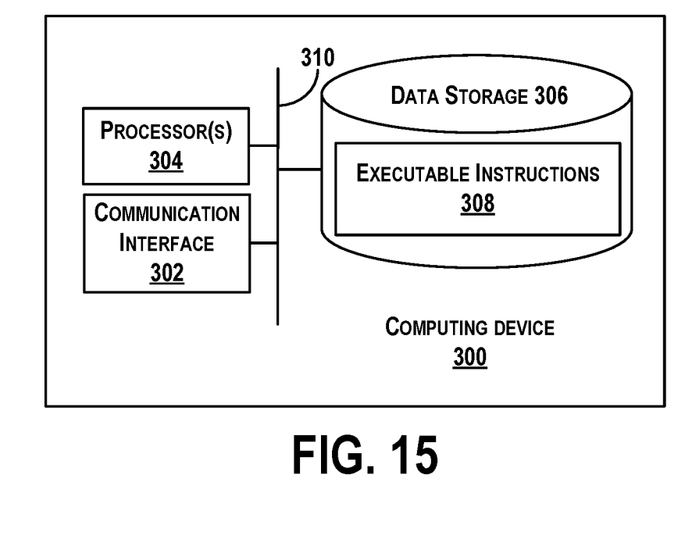
FIG. 15 illustrates a block diagram of a computing device, according to an example implementation.

FIG. 15 illustrates a block diagram of a computing device 300, according to an example implementation. As shown, the computing device 300 includes a communication interface 302, such as a wireless interface, configured for sending and receiving data (e.g., commands) from other devices (e.g., sensors, local control systems of electromechanical devices). Further, the computing device 300 includes one or more processors 304, data storage 306, and executable instructions 308. The communication interface 302, the one or more processors 304, and the data storage 306 are each connected to a communication bus 310.

The data storage 306 may include or take the form of memory, such as one or more computer-readable storage media that can be read or accessed by the one or more processors 304. The computer-readable storage media can include volatile and/or non-volatile storage components, such as optical, magnetic, organic or other memory or disc storage, which can be integrated in whole or in part with the one or more processors 304. The data storage 306 is considered non-transitory computer readable media. In some examples, the data storage 306 can be implemented using a single physical device (e.g., one optical, magnetic, organic or other memory or disc storage unit), while in other examples, the data storage 306 can be implemented using two or more physical devices.

The data storage 306 thus is a non-transitory computer readable storage medium, and the executable instructions 308 are stored thereon. The executable instructions 308 include computer executable code.

The one or more processors 304 may be general-purpose processors or special purpose processors (e.g., digital signal processors, application specific integrated circuits, etc.). The one or more processors 304 can be configured to execute the executable instructions 308 (e.g., computer-readable program instructions) that are stored in the data storage 306 and are executable to provide the functionality of the computing device 300.

Within one example, in operation, when the executable instructions 308 are executed by the one or more processors 304 of the computing device 300, the one or more processors 304 are caused to perform functions including: pressurizing a plenum chamber within a thermal protection apparatus with pressurized air, where the thermal protection apparatus comprises a composite wall and a thermal insulation blanket, where the thermal insulation blanket is coupled to the composite wall by way of a sealant disposed around, and offset from, a perimeter of the composite wall and disposed between the composite wall and the thermal insulation blanket, and where the composite wall, the thermal insulation blanket, and the sealant form the plenum chamber within the thermal protection apparatus; heating the pressurized air within the plenum chamber; and inserting a liquid crystal sheet between the composite wall and the thermal insulation blanket and proximate to a periphery of the sealant, wherein the liquid crystal sheet is configured to change color when heated pressurized air exits a gap in the thermal protection apparatus and heats the liquid crystal sheet.

Within the example described above, another function could include, after inserting the liquid crystal sheet between the composite wall and the thermal insulation blanket and proximate to the periphery of the sealant, determining a location of the gap in relation to a location of a surface area of the liquid crystal sheet that exhibited a color change when the liquid crystal sheet was inserted between the composite wall and the thermal insulation blanket and proximate to the periphery of the sealant. Other functions are possible as well.

Within examples, the act of pressurizing the plenum chamber can involve the computing device 300 transmitting an instruction that, when received by another device, causes a valve to open so as to convey stored pressurized air through a heating device and into the plenum chamber. Additionally, within such examples, the act of heating the pressurized air can involve the computing device 300 transmitting an instruction that, when received by a heating device (or a controller (e.g., the PID controller) of the heating device), causes the heating device to heat pressurized air as the pressurized air passes through the heating device, or rather to heat pressurized air that is already in the plenum chamber. Additionally, within such examples, the act of inserting the liquid crystal sheet can involve transmitting an instruction that, when received by a control system for a robotic apparatus (e.g., a robotic arm), causes the robotic apparatus to insert, for a predetermined period of time (e.g., 5 seconds or less), a liquid crystal sheet of a particular size in a predetermined area along the periphery of the sealant. Other examples are possible as well.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of inspecting a thermal protection apparatus, wherein the thermal protection apparatus comprises a composite wall and a thermal insulation blanket, wherein the thermal insulation blanket is coupled to the composite wall by way of a sealant disposed around, and offset from, a perimeter of the composite wall and disposed between the composite wall and the thermal insulation blanket, and wherein the composite wall, the thermal insulation blanket, and the sealant form a plenum chamber within the thermal protection apparatus, the method comprising:
   pressurizing the plenum chamber with pressurized air;
   heating the pressurized air within the plenum chamber; and
   inserting a liquid crystal sheet between the composite wall and the thermal insulation blanket and proximate to a periphery of the sealant, wherein the liquid crystal sheet is configured to change color when heated pressurized air exits a gap in the thermal protection apparatus and heats the liquid crystal sheet.

2. The method of claim 1, further comprising:
   before pressurizing the plenum chamber with the pressurized air, providing, in the thermal insulation blanket, an outlet configured for venting pressurized air from the plenum chamber, increasing flow rate of pressurized air into the plenum chamber, and maintaining substantially constant pressure in the plenum chamber.

3. The method of claim 1, wherein pressurizing the plenum chamber with pressurized air comprises introducing the pressurized air into the plenum chamber at a proximate geometric center of the thermal protection apparatus, whereby a distribution of the pressurized air is substantially uniform.

4. The method of claim 1, wherein pressurizing the plenum chamber with pressurized air comprises pressurizing the plenum chamber to a pressure in a range between 0.05 pounds per square inch gauge to 0.1 pounds per square inch gauge.

5. The method of claim 1, wherein heating the pressurized air within the plenum chamber comprises heating the pressurized air within the plenum chamber to a temperature in a range between 100 degrees Fahrenheit and 125 degrees Fahrenheit.

6. The method of claim 1, wherein pressurizing the plenum chamber with pressurized air and heating the pressurized air within the plenum chamber comprises:
   controlling a heating device to heat the pressurized air; and
   after heating the pressurized air, causing the heated pressurized air to be conveyed into the plenum chamber.

7. The method of claim 6, further comprising:
   receiving, by a controller, from a temperature sensor in the plenum chamber, data indicative of a temperature of the heated pressurized air within the plenum chamber;
   determining, by the controller, that the temperature of the heated pressurized air is outside of a predefined temperature range; and
   in response to determining that the temperature of the heated pressurized air is outside of the predefined temperature range, controlling, by the controller, the heating device to adjust a heating temperature at which the heating device is heating the pressurized air.

8. The method of claim 1, wherein inserting the liquid crystal sheet between the composite wall and the thermal insulation blanket and proximate to the periphery of the sealant comprises inserting the liquid crystal sheet between the composite wall and the thermal insulation blanket and proximate to the periphery of the sealant for a time in a range between 0.5 seconds and 3 seconds.

9. The method of claim 1, further comprising:
   after inserting the liquid crystal sheet between the composite wall and the thermal insulation blanket and proximate to the periphery of the sealant, determining a location of the gap in relation to a location of a surface area of the liquid crystal sheet that exhibited a color change when the liquid crystal sheet was inserted between the composite wall and the thermal insulation blanket and proximate to the periphery of the sealant.

10. The method of claim 1, further comprising:
    after inserting the liquid crystal sheet between the composite wall and the thermal insulation blanket and proximate to the periphery of the sealant:
      measuring a size of a surface area of the liquid crystal sheet that exhibited a color change; and
      based on the size of the surface area of the liquid crystal sheet that exhibited the color change, determining whether the gap is present in the thermal protection apparatus.

11. A system comprising:
    a thermal protection apparatus comprising a composite wall and a thermal insulation blanket, wherein the thermal insulation blanket is coupled to the composite wall by way of a sealant disposed around, and offset from, a perimeter of the composite wall and disposed between the composite wall and the thermal insulation blanket, and wherein the composite wall, the thermal insulation blanket, and the sealant form a plenum chamber within the thermal protection apparatus; and
    a liquid crystal sheet removably disposed between the composite wall and the thermal insulation blanket and proximate to a periphery of the sealant, wherein the liquid crystal sheet is configured to change color when heated pressurized air exits a gap in the thermal protection apparatus and heats the liquid crystal sheet.

12. The system of claim 11, wherein the thermal protection apparatus is disposed within a thrust reverser of an aircraft.

13. The system of claim 11, wherein the sealant is a prefabricated seal.

14. The system of claim 11, wherein the sealant is a bead of sealant.

15. The system of claim 11, wherein the sealant is offset from the perimeter of the composite wall by a distance in a range between 10 millimeters and 60 millimeters, and wherein the sealant has a substantially uniform width in a range between 10 millimeters and 40 millimeters.

16. The system of claim 11, wherein the liquid crystal sheet is configured to change color when the heated pressurized air is at a temperature in a range between 100 degrees Fahrenheit and 125 degrees Fahrenheit.

17. The system of claim 11, further comprising:
    a heating device configured to heat pressurized air before the heated pressurized air is conveyed into the plenum chamber;
    a temperature sensor in the plenum chamber configured to acquire data indicative of a temperature of the heated pressurized air within the plenum chamber; and
    a controller configured to control the heating device to heat the pressurized air before the heated pressurized air is conveyed into the plenum chamber and further configured to regulate the temperature of the heated pressurized air within the plenum chamber based on the data.

18. The system of claim 17, wherein regulating the temperature of the heated pressurized air within the plenum chamber based on the data comprises the controller (i) receiving the data from the temperature sensor, (ii) determining that the temperature of the heated pressurized air is outside of a predefined temperature range, and (iii) in response to determining that the temperature of the heated pressurized air is outside of the predefined temperature range, controlling the heating device to adjust a heating temperature at which the heating device is heating the pressurized air.

19. A non-transitory computer readable medium having stored thereon instructions, that when executed by one or more processors of a computing device, cause the computing device to perform functions comprising:

pressurizing a plenum chamber within a thermal protection apparatus with pressurized air, wherein the thermal protection apparatus comprises a composite wall and a thermal insulation blanket, wherein the thermal insulation blanket is coupled to the composite wall by way of a sealant disposed around, and offset from, a perimeter of the composite wall and disposed between the composite wall and the thermal insulation blanket, and wherein the composite wall, the thermal insulation blanket, and the sealant form the plenum chamber within the thermal protection apparatus;

heating the pressurized air within the plenum chamber; and     inserting a liquid crystal sheet between the composite wall and the thermal insulation blanket and proximate to a periphery of the sealant, wherein the liquid crystal sheet is configured to change color when heated pressurized air exits a gap in the thermal protection apparatus and heats the liquid crystal sheet.

20. The non-transitory computer readable medium of claim 19, the functions further comprising:

after inserting the liquid crystal sheet between the composite wall and the thermal insulation blanket and proximate to the periphery of the sealant, determining a location of the gap in relation to a location of a surface area of the liquid crystal sheet that exhibited a color change when the liquid crystal sheet was inserted between the composite wall and the thermal insulation blanket and proximate to the periphery of the sealant.

\* \* \* \* \*